July 21, 1942.  T. H. KRUEGER  2,290,564
MAKING OF BAGS AND ENVELOPES
Filed April 19, 1939  4 Sheets-Sheet 1

INVENTOR.
Theodore H. Krueger
BY Edward Thomas
his ATTORNEY.

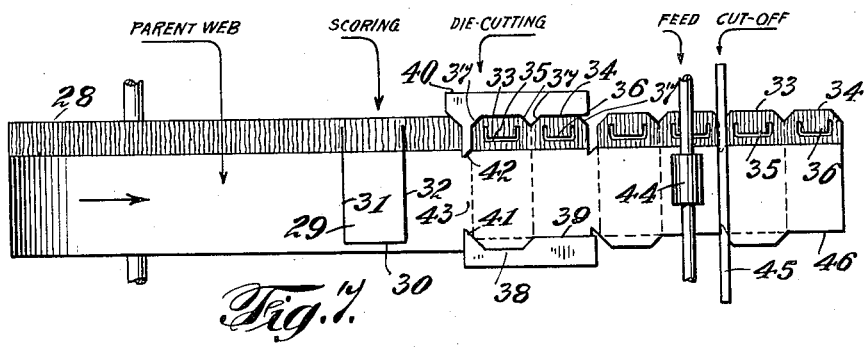
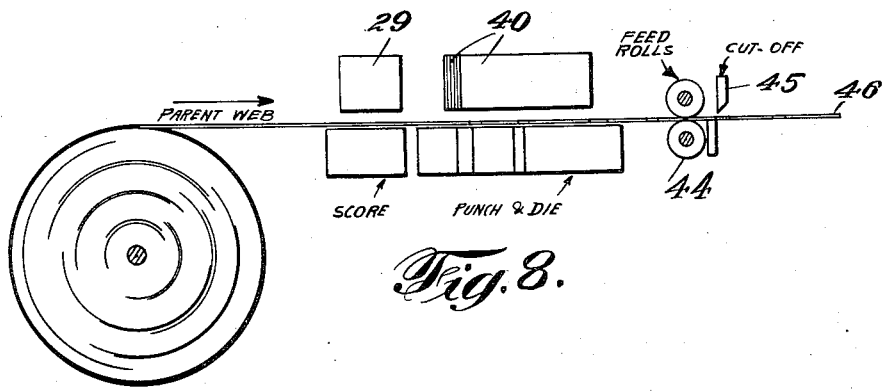
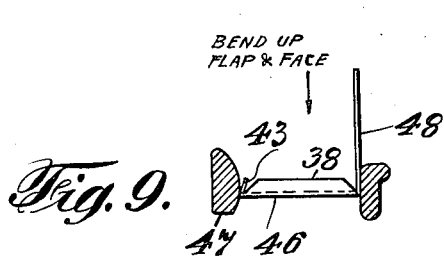
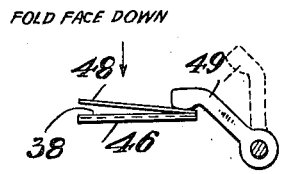
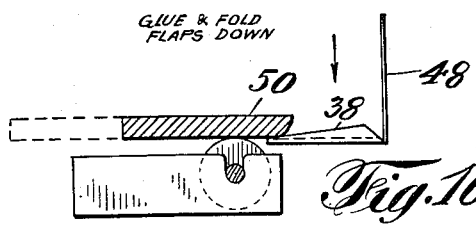

July 21, 1942.  T. H. KRUEGER  2,290,564
MAKING OF BAGS AND ENVELOPES
Filed April 19, 1939  4 Sheets-Sheet 3
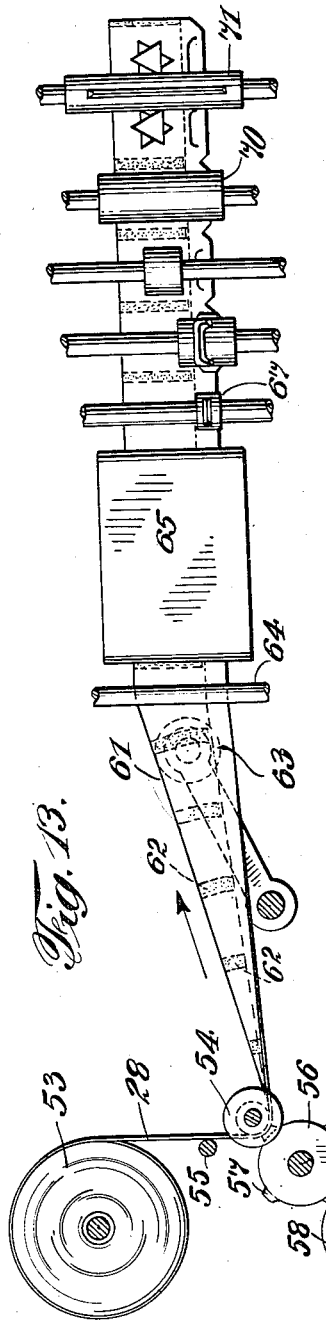
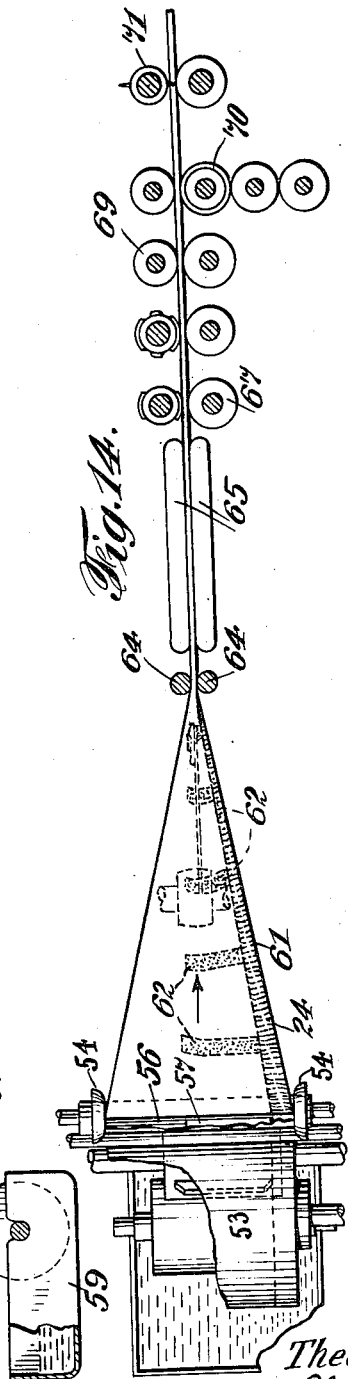
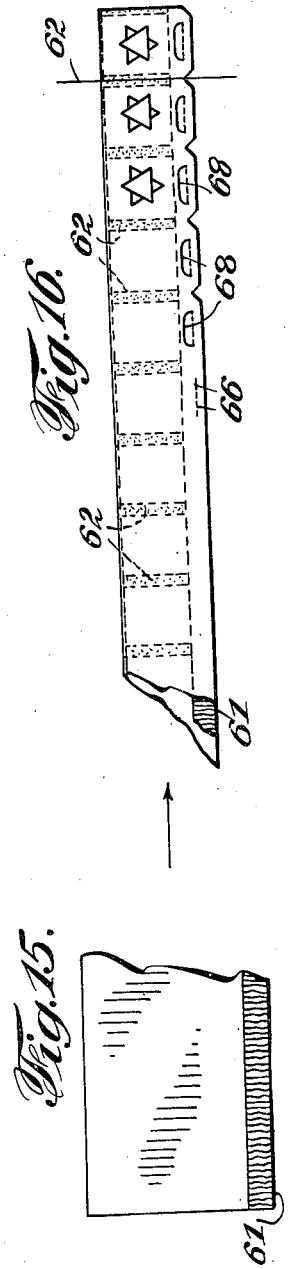
INVENTOR.
Theodore H. Krueger
BY Edward Thomas
his ATTORNEY.

July 21, 1942. T. H. KRUEGER 2,290,564
MAKING OF BAGS AND ENVELOPES
Filed April 19, 1939 4 Sheets-Sheet 4

INVENTOR.
Theodore H. Krueger
BY Edward Thomas
his ATTORNEY.

Patented July 21, 1942

2,290,564

UNITED STATES PATENT OFFICE 2,290,564

MAKING OF BAGS AND ENVELOPES

Theodore H. Krueger, Shelton, Conn.

Application April 19, 1939, Serial No. 268,665

5 Claims. (Cl. 93—35)

This invention relates to the making of bags and envelopes and is herein disclosed in some detail as embodied in methods of making carry bags and other bags and envelopes.

Both bags and envelopes with glued seams have been made for many years, but are open to many objections. The envelope is usually sealed by moistening a strip of glue or gum, and this must be pressed down and held at least momentarily to ensure proper holding. The gum has a taste, and glue has an odor, both being unpleasant to many people.

The sealing operation requires at least a certain amount of water, so that an excess must usually be employed to be certain that the glue or gum everywhere receives at least the necessary minimum. Thus the operation is often messy and takes time and a certain amount of careful attention.

Even at that, the sealing by glue is quicker than wrapping up with paper and tied string, so there is a strong demand for a satisfactory sealing bag and envelope, because customers become dissatisfied when kept waiting, to say nothing of the costly time used up by sales help.

To overcome these and other difficulties it has been proposed to make envelopes with sealing strips or bands of sealing material which adhere on contact, but such envelopes require to be especially folded and require care in handling to avoid accidental sealing. In carry bags it has been proposed to overcome these difficulties by providing the bag with a tongue or other interlocking part which is adapted to close the top of the bag. It has been found, however, that bags thus locked soon spring open or work open, with the result that actual count shows most of these bags are unlocked when the customer reaches the outside door of the store. Moreover, these so-called lock bags are a convenient device for shoplifters. The shoplifter buys a low priced article, has it put in a lock bag, allows the bag to work itself open, tucks the stolen merchandise into the open bag and conceals it by locking the bag. Many bags had to be reinforced by strips or reinforcing board, adding to the cost and greatly slowing the production because the reinforcing was a patch operation.

Gummed tape has been tried for sealing bags and abandoned, because it was essential to use a sealing gum which sticks quickly and such gums must be strong smelling animal glue. It is found that the evil-smelling glue quickly contaminates the customer's hands or gloves, and, it is partly for that reason that glue sealing tapes have been abandoned.

Attempts have been made to produce a heat sealed bag or envelope, and, where power sealing presses were available, it has been possible to use the heat seal compositions hitherto available. But carrying the bag or envelope to a press took time, and no firm seal was effected unless the surfaces were pressed together by a power press, or by a foot operated toggle press.

According to the present invention the foregoing difficulties and objections are overcome and a heat sealed bag is provided which seals without substantial pressure, which can be made at high speed, and which is amply strong without reinforcing.

To enable the bag, or envelope, to be produced at a reasonable price the process of manufacturing has to be considerably modified from the processes hitherto in use, one reason being that the available heat-sealing composition, which is described below, cannot be applied successfully except by roll and doctor bar and in a continuous coating along the whole length of the web of paper. Thus the difficulty arises that seams at right angles to each other cannot both be bound by the heat sealing composition.

According to the present invention there are produced bags and envelopes which are heat sealed by a trivial pressure when proper heat is present, that hold the heat-sealed seam firmly, that make a broad seam so strong that the bag material serves as its own reinforcing, and that yet uses a heat sealing composition which is odorless, tasteless and non-toxic.

To obtain these and other advantages the bag or envelope is shown below as made by first coating a continuous web of paper or other material with a stripe of the heat-sealing composition which is then dusted with starch, etc. to render it non-pressure sealing and then putting the stripe-coated paper through the rest of the procedures needed to make the bag or envelope. Or, by a modification of this process a continuous narrow paper tape, coated on its outer surface with heat-seal composition and dusted with starch, etc. is glued as a continuous edging ribbon along one edge of the paper web from which the bags are later made. The stripe or coated paper tape is usually narrower than half the width of the web.

These procedures will depend somewhat on the exact type of bag or envelope desired.

According to one set of procedures the stripe-coated or edge-taped web is cut either into sheets or into special forms, and then glued or gummed and folded upon an ordinary type of envelope machine or some analogous machine.

According to a somewhat faster procedure the stripe-coated or tape-edged moving web is shown as die-cut, scored and glue-spotted while the bag blanks. The severed blanks are then folded and pressed to obtain firm adhesion at the glued seams.

According to a third and still faster procedure a single fold flat bag is shown as made by glue-spotting the stripe-coated or tape-edge web, folding to initially form the bag bottoms, scoring, punching out a handle for example, printing and finally cutting off from the web the finished bags.

Other features and advantages will hereinafter appear.

In the accompanying drawings:

Figure 7 shows diagrammatically one process of making a blank for a modified form of bag for heat-sealing, incidentally making the blank of Figure 3.

Figure 8 is a side view of the parts shown in Figure 7.

Figure 9 shows the next or bending up step in manipulating the blank made in Figures 7 and 8.

Figure 10 shows the following, gluing, step.

Figure 11 shows the face folding-down step.

Figure 12 shows the pressing step.

Figure 13 shows diagrammatically in a side view a third process for making the heat sealed bag shown in Figs. 1, 2 and 3.

Figure 14 shows a diagrammatic top view of what is shown in Fig. 13.

Figure 15 is a fragmentary view of the web coated with heat-sealing material.

Figure 16 shows the web of Figs. 13 and 14 in its successive steps of forming the finished bag.

Figure 1:
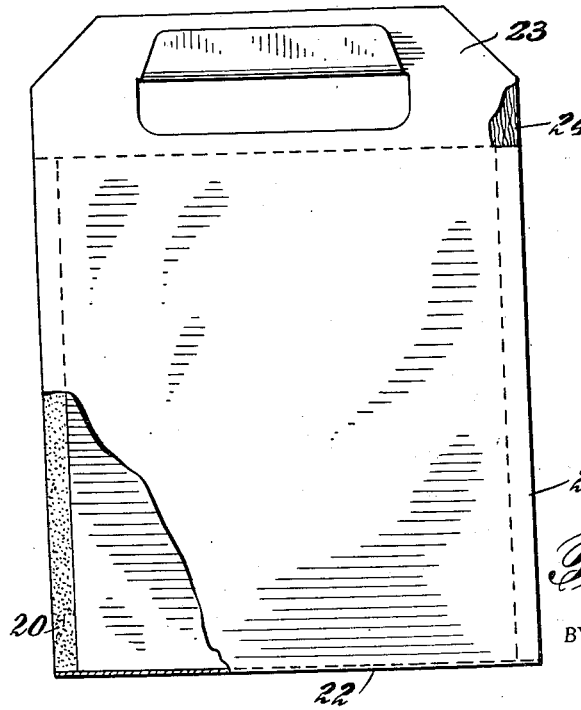
Figure 1 is a face of one form of bag after sealing.
Figure 2:
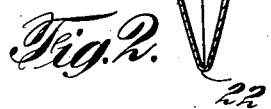
Figure 2 is a side view of the same.

The bag illustrated in Figures 1 and 2 is made with glued side seams 20, 21, a seamless, folded bottom, 22, and with an open top 23 provided with an internal stripe 24 of the heat sealing material described below in some detail.

That heat sealing material 24 cannot be "spotted" but can only be applied, commercially, by a doctor bar or roll, and a cooperating roll or bar. For this reason the side seams must be sealed with some other material, because they run at right angles to the stripe 24.

Figure 4:
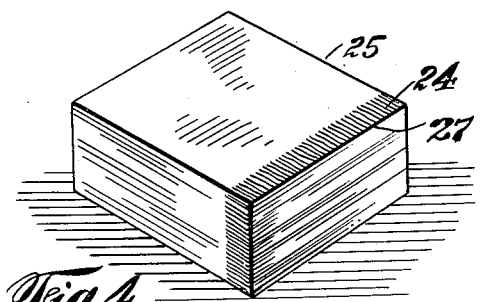
Figure 4 shows one form of cut sheet for making blanks suitable for making the bag of Figure 1, or for die cutting into envelope blanks.
Figure 5:
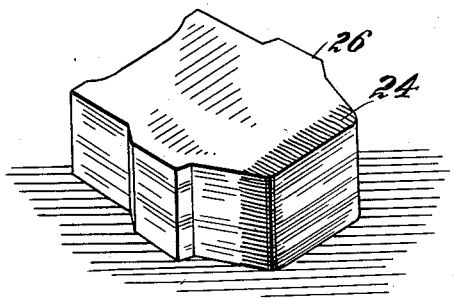
Figure 5 shows another blank, suitable for making an envelope.
Figure 6:
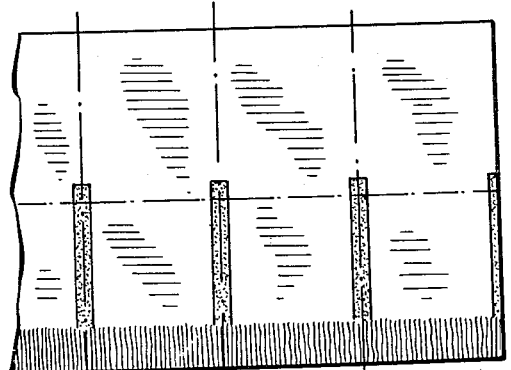
Figure 6 shows another form of blank suitable for making the bag of Figure 1.

In the form of the invention illustrated in Figures 1 and 2, the bag, or envelope of Figure 5 for that matter, is made from a long web of paper coated at a suitable stripe or heat seal tape 24, and then cut into sheets 25, Figure 4. These sheets 25 are then cut, as by a die, to the shape of the desired blank in which the coated stripe 24 lies along one edge 27.

The blanks 26 are shown in Figure 5, are suitable for making the envelope shown in Figure 1 of application, Serial No. 233,513, a division of Serial No. 131,565.

To make that envelope, these blanks 26 were gummed, along other seams, and folded and finished in any suitable type of envelope making machine, the stripe 24 of heat seal material being left unsealed and having no tendency to stick or otherwise interfere with the folding operations.

Figure 3:
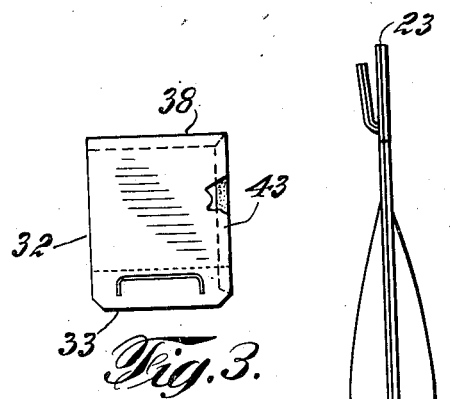
Figure 3 shows another form of bag, the form shown in Figure 1 of Serial No. 131,565.

The process of making a bag such as Fig. 1 of Serial 131,565, Figure 3 above which is partly shown in Figure 7, includes feeding the stripe-coated web 28 to the right.

The stripe 24 had been applied by running the web of paper between a roll and doctor bar so as to suitably spread the thermoplastic adhesive obtained when paraffine wax having a melting point of 130 to 140° F. was melted and 6% to 30% of thin pale crepe rubber R. C. M. A. not more than 0.04 inch thick was quickly immersed in individual sheets at 200° F., soaked for fifteen minutes and agitated for two hours in a Warner-Pfleiderer class III type BB mixer. An age resistant, such as ½% of hydroquinone could be added. Gutta percha has been substituted for rubber and other waxes for paraffine wax.

The ingredients (other wax was usable) were preferably so adjusted that the tissue became adhesive between 150° and 180° F. Instead of applying the heat seal composition directly to the bag paper, it can be applied, as described above, to a paper tape of the proper width, which is then glued as a continuous edging along one edge of the bag-paper web.

The moving heat-seal-edged web was carried under a scoring device 29 which served to score the paper for the bottom fold 30, the side fold 31, and the side fold 32. The web carried the scored form beneath a suitable die cutting device 40 which cut, by their tapers 37, top flaps 33 and 34, which were to face each other in the completed bag, and also cut the smaller handle-forming flaps 35 and 36 in the top flaps 33 and 34. The dies shown also cut the flap 38 which extends from the score line 30, and cut off the other wall of the bag short at 39, so that the flap 38 would later overlie it.

The die device 40 also cuts the slanting ends of 41, 42 of what was later to become the vertical flap 43 (see Figure 9) of the bag.

The web was again fed along to the right, partly by a feedroll diagrammatically shown at 44, until it reached a cut-off device 45, where the still flat blank 46 is severed from the web. The blank is then submitted to the operations illustrated in Figures 9 to 12, preferably carried out in a line at right angles to the plane of the web 28, thus enabling the intermittently fed web 28 to be fed at shorter intervals, by suitable well known ratchet and pawl actuated feed rollers 44.

First the severed blank 46 encounters bending up devices 47, partly shown as bending up the flap 43, the short wall 48, and the bottom flap 38. Next the blank 46 encounters a folding down device 49 which folds down the short wall 48.

After that the blank 46 is shown encountering the gluing and folding device 50, which glues the flaps 38 and 43, and folds them down on the short wall 48, completing the bag except for the pressing and removing, diagrammatically shown as effected by a device 51.

A third procedure for making a bag of the present invention, namely the bag shown in Figures 1 and 2, is shown in Figures 13 to 16, in which a similar stripe-coated or tape-edged web is drawn from a supply roll of the bag material 53 around a roller 54 past a guide-rod or roll 55 and is "spotted" with glue at the roll 54 by a cooperating glue-spotting roller 56 which has spaced raised spotting-surfaces 57. These surfaces are kept freshly covered with glue by "gluing" roller 58 which dips in a fountain 59. The spotting surfaces 57 then "spot" glue at 62, 62 along and across the lines of future bag edges.

The web is shown as carrying a single stripe 24 of the heat-seal composition or heat seal tape at the edge 61, and the spotted lines 62 of glue are shown as extending from the stripe 24 to the center of the web or a little further.

The web as shown travels from the roll 54 to the right over a central, narrow faced folding wheel 63 so that a longitudinal fold or crease is formed in the web, which becomes a fold where the web passes between two closely set vertical rods or rolls 64. Then the web is shown as passing through a pressing and creasing device 65, from which it emerges as a continuous folded web adapted to be severed into separate bags, which are open at the mouth along the stripe 24.

To complete the bags with carry handles in the open flaps of the mouth, the travelling web is shown as scored at 66 by a scoring device 67 to form an incipient fold for the handle. Next it is shown as punched to form the fully cut handles 68, which do not tend to adhere with the above described heat-sealing composition when the same is dusted with starch as I do in making these bags.

A feed roll 69 is next shown as feeding the web past a printing roller 70, and finally a cut off 71 severs the completed carry bag centrally of the glue-spotting area, along a line 62, from the web, the bag being folded at the bottom and glued at the closed side seams and ready to be heat-sealed at its open top.

Figure 17:
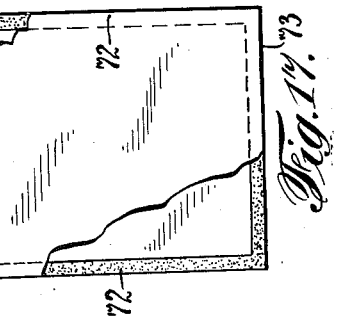
Figure 17 shows an alternative form of bag.
Figure 18:
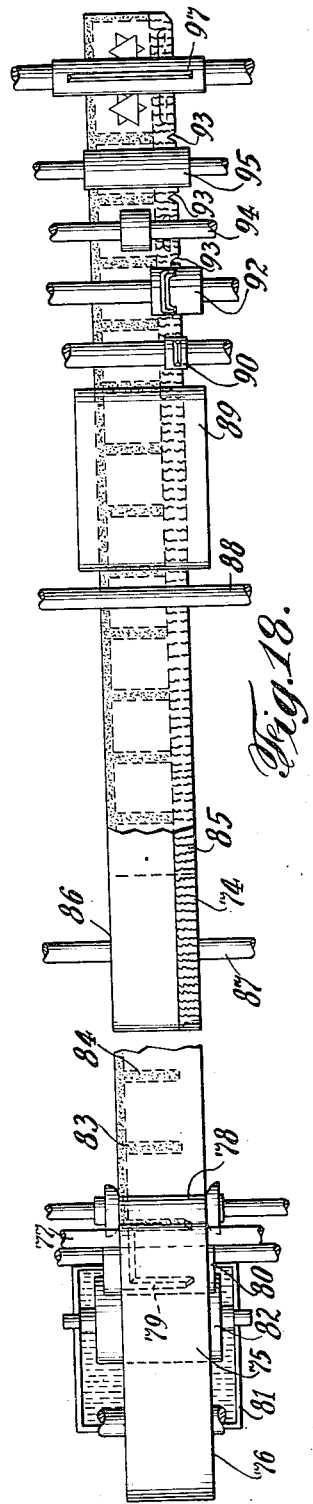
Figure 18 is a diagrammatic top view of a device for forming that bag.
Figure 19:
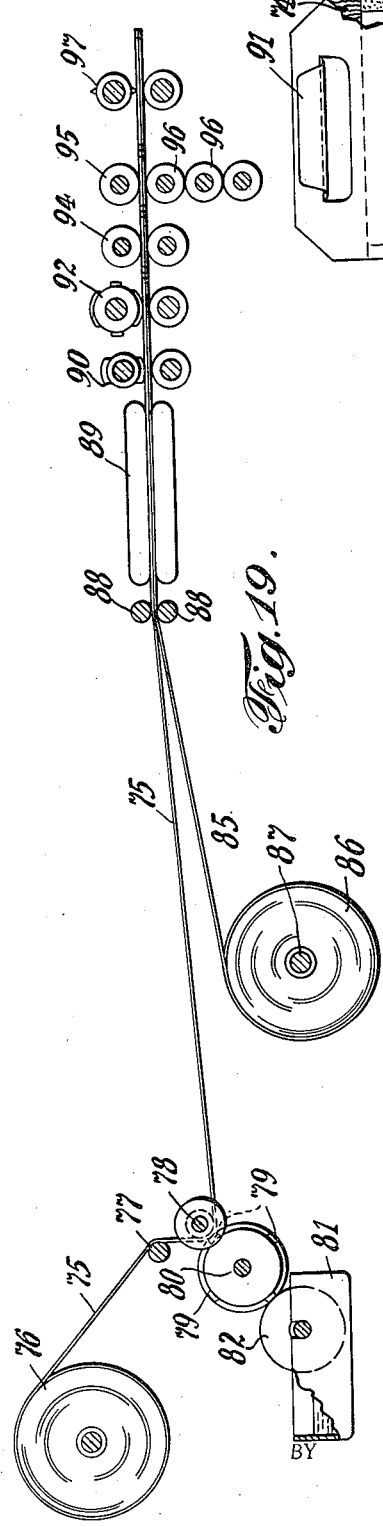
Figure 19 is a similar side view of the same.
Figure 21:
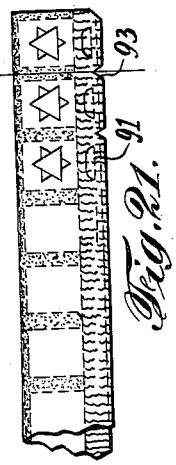
Figure 21 shows the steps in completing the bag.

Still another form of bag is shown in Figure 17, made of two separate blanks glued together by any suitable adhesive along their sides 72 and bottoms 73, and provided with the same kind of heat seal stripe 74 at the open neck as is provided for the bags of Figures 2 and 3, for example, and a handle 91 is also provided.

A process for making the bag of Figure 17 is diagrammatically illustrated in Figures 18, 19, 20 and 21.

In these figures one web 75 is shown as drawn from an upper reel 76, over a guide rod 77, and under a supporting roller 78 so that glue may be spotted on the web by impression faces 79 of a spotting roller 80.

Figure 20:
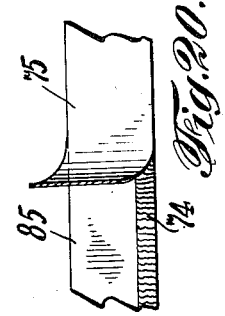
Figure 20 shows a fragment of the webs.

The roller 80 is shown above a glue fountain 81, so that a feed roller 82 dipping in the fountain supplies glue to the faces 79, thereby gluing the web 75 along one edge 83, which will form the bottoms of the bags, and also gluing the web along transverse stripes 84 which will later glue the sides of the bags together up as far as the stripe 74 of Figure 17, which might be on the web 75, but is shown only on a second web 85, see Figure 20.

In the form shown the second web 85 is drawn from a second reel 86 supported by a shaft 87, so that the two webs come together between transverse rods 88, while the glue from the fountain 81 is still wet.

The two webs, now in contact, enter a presser diagrammatically shown at 89, kept cool enough, like the presser 65, to avoid any possibility of sticking of the heat seal strips 74, which may be dusted as with starch by way of precaution. The webs 75 and 85 issue from the presser 89 glued together, and are then shown as passing below a scoring roll 90 to initially score part of the handle 91.

Next the webs are shown as passing below a handle-cutting die or punch 92 which cuts out the handle 91 and trims the corners 93.

A feed roll 94 is shown as feeding the webs on next to a printing roll 95, shown as receiving ink from rolls 96. Finally the webs are shown as reaching a cut off knife 97, which severs the finished bags, with a glued bottom 73, glued side seams 72, and a stripe of heat-seal adhesive inside the open top.

The stripe 74 may be applied to the web 85 direct by a doctor bar, or may be a paper tape carrying the adhesive and glued to the web at any suitable stage of manufacture.

This application is in part a continuation of Serial No. 131,565.

Having thus described certain embodiments of the invention, what is claimed is:

1. The process of making a paper container having a heat softened adhesive stripe for closing it which consists in applying lengthwise a continuous stripe of heat sealing material narrower than half the web width to a web of paper, spotting glue for transverse seams, folding the web to form bag bottoms, and severing at the glue spots to form side seams.

2. The continuous process of making a paper container having a heat softened adhesive stripe for closing it which consists in applying lengthwise a continuous stripe of heat sealing material narrower than half the web width to a moving web of paper, spotting glue for transverse seams on the moving web, folding the moving web to form bag bottoms, and severing at the glue spots to form side seams.

3. The process of making a paper container having a heat softened adhesive stripe for closing it which consists in applying lengthwise a continuous stripe of heat sealing material narrower than half the web width to a web of paper, spotting glue for transverse seams, folding the web to form bag bottoms, pressing and drying the folded web, and severing at the glue spots to form side seams.

4. The continuous process of making a paper container having a heat softened adhesive stripe for closing it which consists in applying lengthwise a continuous stripe of heat sealing material narrower than half the web width to a moving web of paper, spotting glue for transverse seams on the moving web, folding the moving web to form bag bottoms, pressing and drying the folded web, and severing at the glue spots to form side seams.

5. The process of making a handled paper container having a heat softened adhesive stripe for closing it which consists in applying lengthwise a continuous stripe of heat sealing material by a doctor bar to a web of paper, spotting glue for transverse seams, folding the web to form bag bottoms, scoring and cutting handle flaps in the stripe, and severing at the glue spots to form side seams.

THEODORE H. KRUEGER.